Patented Sept. 5, 1950

2,521,095

UNITED STATES PATENT OFFICE 2,521,095

PROCESS OF PREPARING TRIAZENES

Henry H. Richmond, Guelph, Ontario, Canada, assignor to United States Rubber Company, New York, N. Y., a corporation of New Jersey No Drawing. Application October 18, 1947, Serial No. 780,745

11 Claims. (Cl. 260—140)

This invention relates to a process of preparing symmetrical triazenes especially xenyltriazenes. Symmetrical triazenes, which have the general formula R—N=N—NH—R where the R's are identical aryl groups, have heretofore been made by the condensation of aromatic amines with alkyl nitrites, especially amyl nitrites using ethanol, ether and ethyl acetate as solvents. However, the presence of ethanol in the reaction mixture decreases the yield. The use of ether as a solvent is impractical because of the hazard and ethyl acetate is too expensive. Furthermore the triazenes are soluble in the solvents previously employed, making the isolation of the product more difficult.

Triazenes are more usually prepared by the diazotization of the mineral acid salts of the aromatic amines in aqueous solution followed by further condensation with additional amine in neutral or weakly acid media. However, this process cannot be used satisfactorily with amines whose mineral acid salts are either sparingly soluble in water or readily hydrolyzed by water. Examples of such amines are p-xenylamine and m-xenylamine.

The principal object of the present invention is to provide an improved method of making symmetrical triazenes. Another object is to provide an improved method of making symmetrical xenyltriazenes. Another object is to provide a method of the foregoing type which gives very high yields of the desired product expeditiously and at low cost. Another object is to provide a method of the foregoing type which is particularly adapted to those aromatic amines whose mineral acid salts are sparingly soluble in water or are readily hydrolyzed by water so that diazotization is difficult. Another object is to provide an improvement in the alkyl nitrite method of making triazenes whereby the storage and handling of an unstable and dangerous alkyl nitrite such as amyl nitrite is avoided. Numerous other objects will more fully hereinafter appear.

I have discovered that symmetrical xenyltriazenes may be prepared in an improved manner by reacting a zenylamine with an alkyl nitrite while the amine is dissolved in a normally liquid solvent selected from the group consisting of benzene, homologs of benzene, mono-ring-halogenated benzene and mono-ring-halogenated homologs of benzene, whereby the triazene is precipitated and can subsequently be separated from the resulting reaction mixture in any convenient manner, typically by filtration.

The general procedure of my invention involves contacting the xenylamine with an alkyl nitrite in solution in an aromatic hydrocarbon solvent such as benzene, toluene or xylene or an aromatic halide solvent such as chlorobenzene. The xenyltriazene separates out as a mass of crystals of satisfactory purity. The xenyltriazene is but sparingly soluble in solvents of the class enumerated above while the amine is quite soluble in it, and in this way the triazene precipitates and is readily removed by filtration.

While the process of my invention is especially advantageous in the preparation of 1,3-bis(p-xenyl)-triazene and 1,3-bis(m-xenyl)-triazene, respectively, from p-xenylamine and m-xenylamine whose mineral acid salts are insoluble in water, it is so economical and expeditious that it may advantageously be employed to make, 1,3-bis (o-xenyl)-triazene from o-xenylamine even though the mineral acid salts of this amine are soluble in water.

The process of my invention may be used to prepare the triazenes of primary aromatic amines generally whose mineral acid salts are either sparingly soluble in water or readily hydrolyzed by water such as the following: 2,4-dinitroaniline, 4-chloro-2-methylaniline, 2,4-dichloroaniline, 2-nitro-4-methylaniline, 3-nitro-2,4,6-trimethylaniline, 3,4-dichloroaniline, 2,4,6-trichloroaniline, 2,6-dibromoaniline, meta-amino diphenyl, 4'-chloro-4-aminodiphenyl, 4'-nitro-4-aminodiphenyl. The primary aromatic amines employed are soluble in the solvents enumerated above which greatly facilitates the reaction since the alkyl nitrite employed is very soluble in the solvents named. The continuous removal of the triazene as it is formed from the reaction centers by precipitation due to its insolubility in the solvent also greatly expedites the reaction.

As the solvent used as the reaction medium, I may employ any normally liquid mono-cyclic aromatic hydrocarbon which includes benzene and its alkylated homologs, as well as any mono-nuclearly-halogenated derivative of benzene or an alkylated homolog thereof. Specific examples of solvents falling within this classification are benzene, toluene, o-xylene, m-xylene, p-xylene, ethyl benzene, any of the trimethyl benzenes, n-propyl benzene, isopropyl benzene, cymene, any of the diethyl benzenes, etc., fluorobenzene, fluorotoluenes, fluoroxylenes, chlorobenzene, chlorotoluenes, chloroxylenes, bromobenzene, bromotoluenes, bromoxylenes, iodobenzene, iodotoluene, iodoxylenes, etc. The solvent used will generally have a boiling point of between 80 and 200° C.

Any alkyl nitrite may be used in the practice of my invention, examples being methyl, ethyl, n-propyl, isopropyl, n-butyl, isobutyl, secondary butyl, tertiary butyl, n-amyl, isoamyl, n-hexyl, n-heptyl, n-octyl, etc. Generally the alkyl nitrite will be one having from one to five carbon atoms in the alkyl group. I prefer to use an alkyl nitrite whose corresponding alcohol boils sufficiently above or below the solvent used that a mixture of the alcohol and the solvent, which is present in the mother liquor from which the precipitated xenyltriazene has been separated, can be readily resolved by ordinary fractional distillation into separate fractions of alcohol and solvent which can be reused in the process, the solvent fraction being recycled for use in a subsequent reaction and the alcohol fraction being employed to generate more alkyl nitrite which is utilized in a subsequent reaction.

Preferably the boiling points of the solvent and the alcohol corresponding to the alkyl nitrite are at least 10° C. apart, so as to permit separation by ordinary fractional distillation.

I have discovered that methyl nitrite can be especially advantageously employed as the alkyl nitrite in the process of my invention. I have found that methyl nitrite readily condenses with the xenylamines when they are dissolved in solvents such as benzene, toluene, xylene, or chlorobenzene, or the like from the class given above to give symmetrical xenyltriazenes. Methyl nitrite has many advantages over the higher alkyl nitrites which have been commonly used heretofore such as amyl nitrites, and so far as I am aware, methyl nitrite has never been used in the preparation of a triazene. Methyl nitrite offers the advantage that it can be generated simultaneously with its use in the reaction which offers advantages over the preliminary preparation of the higher alkyl nitrites previously used. Methyl nitrite may conveniently be generated by the interaction of an alkali metal nitrite such as sodium nitrite with methyl alcohol and sulfuric acid. I prefer to generate it in a generation zone separate from the reaction zone and to pass the methyl nitrite vapors from the generating zone directly into the reaction zone. Methyl nitrite has the advantage of being a gas (boiling point −12° C.) so that it can be generated readily without heating. There is no need for isolation or purification of the methyl nitrite since it is in substantially pure form as it is generated. Simultaneous generation of the methyl nitrite in this manner avoids the storage and handling of an unstable and dangerous higher alkyl nitrite such as amyl nitrite. The use of methyl nitrite is more economical since smaller quantities of alcohol need be used because of the low molecular weight of methyl alcohol. The product prepared from amyl nitrite smells strongly of objectionable valeric acid due to traces of amyl alcohol which were not removed and which on drying oxidized to valeric acid. Methyl nitrite does not leave such contamination of the product because of the volatility of any methyl alcohol present in the product. The methyl alcohol formed in the reaction can be readily recovered by fractional distillation of the mother liquors since the difference between the boiling point of methyl alcohol and such solvents as xylene and toluene is much greater than between amyl alcohol and the same solvents. The simultaneous formation and use of methyl nitrite saves a great deal of time. The excess of methyl nitrite is more readily removed than is an excess of a higher boiling alkyl nitrite. I have found that when methyl nitrite is used there is no induction period as is the case with the amyl nitrites. The induction period when amyl nitrites are employed is undesirable especially when large batches are made because the reaction becomes violent when it once starts.

The reactions involved in the formation of the methyl nitrite may be indicated as follows:

$$2NaNO_2 + H_2SO_4 \rightarrow HNO_2 + Na_2SO_4$$
$$HNO_2 + CH_3OH \rightarrow CH_3ONO + H_2O$$

It is important to use a solvent such that it is readily separable from the alcohol formed in the reaction. This separation is necessary because alcohol is detrimental to the yield when present in excessive amounts in the reaction medium as would be the case were the solvent re-used without separation of the alcohol. The solvents enumerated herein have the advantage of being good purification media for the xenyltriazenes since they retain in solution strongly colored impurities.

I have unexpectedly found that in order to obtain high yields of the xenyltriazenes when using methyl nitrite, it is necessary to employ a considerable excess thereof over the amount theoretically required by the reaction, which in the case of the preparation of 1,3-bis(p-xenyl)-triazene, may be indicated by the following equations:

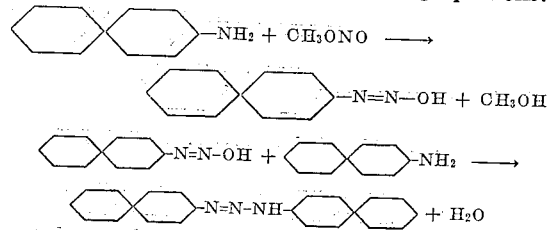

In order to obtain the highest yield of the xenyltriazene, an excess of methyl nitrite equal to about 100 per cent over theoretical is required. However, the excess may be decreased somewhat from this amount without unduly lowering the yield. I may use such an amount of the methyl nitrite that the molar ratio thereof to the amine ranges from 0.75:1 to 1.25:1. If only the theoretical quantity of methyl nitrite is used with p-xenylamine the yield falls from 84 per cent to 32 per cent and the product melts at 115° C. which indicates that considerable impurities are present. All yields referred to herein are based on the xenylamine used.

In the case of the other alkyl nitrites, I generally employ only about the theoretical amount of the nitrite, namely that amount required to give a molar ratio of alkyl nitrite to amine of 0.5:1. Excesses over theoretical may be employed although use thereof offers no advantage.

The amount of solvent employed as the reaction medium in carrying out the present invention may vary widely. The amount thereof should be such that the resulting reaction mixture is pumpable despite the presence therein of the precipitated xenyltriazene. Use of such an amount greatly facilitates subsequent recovery operations, particularly the step of separating the precipitated product which is usually done by filtration. A greater amount of solvent than this may be used but it slows up the reaction and increases the costs, particularly of handling and solvent recovery, and therefore is not desirable. Those skilled in the art will be readily enabled to select a proper amount of solvent in the light of this disclosure. Ordinarily the weight of solvent will range between 1.0 and 4 times the weight of the xenylamine.

The reaction may be carried out under any suitable reaction conditions which promote the desired formation of the xenyltriazene by condensation of the alkyl nitrite and the xenylamine. Ordinarily the temperature of reaction will range from 20 to 60° C. If necessary the reaction mixture may be cooled during the reaction in order to keep the temperature from rising unduly. The time of reaction cannot be specified exactly since it will vary widely depending on conditions but it preferably is sufficient to permit the reaction to proceed to substantial completion. Ordinarily the reaction mixture is allowed simply to stand until precipitation of the xenyltriazene is substantially complete. If desired the reaction mixture may be stirred during the addition of the alkyl nitrite and it may also be stirred during the subsequent period of time to break up the precipitate.

The process of my invention is ordinarily conducted in a batchwise manner but it may be carried out continuously by appropriate modification in a manner obvious to those skilled in the art.

Following are specific examples of the practice of my invention:

Example I

To a solution of 200 g. of p-xenylamine in 800 cc. of benzene there was added 84 cc. of isoamyl nitrite, keeping the reaction mixture at room temperature, and the mixture allowed to stand at this temperature with cooling if necessary, depositing crystals of 1,3-bis(p-xenyl)-triazene over a period of twenty-four hours. The solid was then filtered off and after washing with benzene and air drying, melted at 140–141° C. with gassing. Yields as high as 95% of the theoretical were obtained. The benzene and isoamyl alcohol were separately recovered by fractionation of the mother liquors and re-used in subsequent runs.

Example II

To a solution of 10 g. of o-xenylamine in 20 cc. of benzene there was added 4.0 cc. of n-amyl nitrite and the mixture allowed to stand at room temperature until no more crystals were deposited. The crude 1,3-bis(o-xenyl-triazene melted at 159° with gassing and on crystallization from methanol melted at 165° with gassing.

Example III

To a one litre three-necked flask equipped with a dropping funnel, a sealed stirrer and a water cooled condenser, there was added 32 g. (0.46 moles) sodium nitrite, 20 cc. (0.50 moles) methanol and 20 cc. of water. The water-cooled condenser was connected to the inlet tube of another reactor which consisted of another one litre three-necked flask equipped with the above mentioned inlet-tube, a sealed stirrer, a water cooled condenser and a thermometer. Into the second reactor there was placed a solution of 70 g. (0.41 moles) of o-xenylamine in 300 cc. of toluene. Both stirrers were started, and into the first reactor there was dropped over a period of forty-five minutes, 51 cc. of sulfuric acid solution made up from two volumes of water and one volume of 95% sulfuric acid. The generated methyl nitrite gas bubbled through the o-xenylamine solution. The temperature rose from room temperature to 30° C. over the addition period. After stirring a few minutes, subsequent to the addition period, until methyl nitrite ceased formation, the clear reaction solution was allowed to stand. After several hours when a precipitate of the triazene began to form, the stirring was renewed to keep the mixture broken up. The precipitation was complete in 12–24 hours. The first crop of 1,3-bis(o-xenyl)-triazene was then filtered off and washed with toluene. The filtrate was concentrated under partial vacuum to about 100 cc., recovering methanol and toluene. A second crop of the triazene was obtained from the concentrate on cooling. Total yield was 65.7 g or 89% of the theoretical. The composite product melted at 159–160°. The methanol and toluene were recovered by fractionation.

Example IV

Into a solution of 70.6 g. of p-xenylamine in 150 cc. of toluene there was passed a stream of methyl nitrite generated by dropping a solution of 51 cc. of 2:1 water–95% sulfuric acid into a mixture of 32 g. sodium nitrite, 20 cc. methanol and 20 cc. water, the temperature rising to 25° C. When all the triazene had precipitated it was filtered off and dried. The yield of 1,3-bis(p-xenyl)-triazene was 83.6% of theory, the product melting at 135°. The methanol and toluene were recovered from the mother liquors by fractionation.

Example V

To a solution of 500 g. of p-xenylamine in 1500 cc. of benzene there was added 154 g. of n-butyl nitrite and the mixture was allowed to stand at room temperature until precipitation was complete. The yield of 1,3-bis(p-xenyl)-triazene that was filtered off and dried was 65% M. P. 135°.

I believe that I am the first to prepare 1,3-bis(o-xenyl)-triazene which has the structural formula

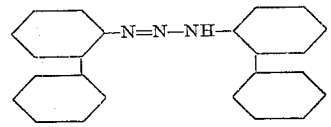

and which is claimed as a new chemical compound in my copending application Serial No. 780,746, filed of even date herewith, now Patent No. 2,448,155.

The symmetrical xenyltriazenes made in accordance with my invention have many uses. They may be employed as chemical intermediates for the synthesis of other chemicals, especially dyestuffs. They are very useful as blowing agents for the manufacture of expanded rubber and plastics, which is covered in the copending application, Serial No. 780,744, filed of even date herewith, now Patent No. 2,448,154 in the name of the present applicant and another.

Having thus described my invention, what I claim and desire to protect by Letters Patent is:

1. The process of preparing symmetrical xenyltriazenes which comprises reacting a xenylamine with an alkyl nitrite, said xenylamine being in solution in a normally liquid solvent selected from the group consisting of benzene, homologs of benzene, mono-ring-halogenated benzene and mono-ring-halogenated homologs of benzene, effecting precipitation of the xenyltriazene, and separating the precipitated xenyltriazene from the resulting reaction mixture.

2. The process of preparing symmetrical xenyltriazenes which comprises reacting a xenylamine with an alkyl nitrite, said xenylamine being in solution in a normally liquid solvent selected from the group consisting of benzene, homologs of benzene, mono-ring-halogenated benzene and mono-ring-halogenated homologs of benzene, maintaining a reaction temperature of from 20° to 60° C., effecting precipitation of the xenyltriazene, and separating the precipitated xenyltriazene from the resulting reaction mixture.

3. The process of preparing symmetrical xenyltriazenes which comprises reacting a xenylamine with methyl nitrite, said xenylamine being in solution in a normally liquid solvent selected from the group consisting of benzene, homologs of benzene, mono-ring-halogenated benzene and mono-ring-halogenated homologs of benzene, effecting precipitation of the xenyltriazene, and separating the precipitated xenyltriazene from the resulting reaction mixture.

4. The process of preparing symmetrical xenyltriazenes which comprises passing methyl nitrite into a solution of a xenylamine in a normally liquid solvent selected from the group consisting of benzene, homologs of benzene, mono-ring-halogenated benzene and mono-ring-halogenated homologs of benzene in a reaction zone, effecting precipitation of the xenyltriazene in said reaction zone, and separating the precipitated xenyltriazene from the resulting reaction mixture.

5. The process of claim 3 wherein said methyl nitrite is employed in an amount such that the molar ratio of methyl nitrite to said xenylamine ranges from 0.75:1 to 1.25:1.

6. The process of preparing 1,3-bis(o-xenyl)-triazene having the structural formula

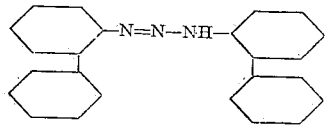

which comprises reacting o-xenylamine with methyl nitrite, said o-xenylamine being in solution in a normally liquid solvent selected from the group consisting of benzene, homologs of benzene, mono-ring-halogenated benzene, mono-ring-halogenated homologs of benzene, effecting precipitation of the 1,3-bis(o-xenyl)-triazene, and separating the precipitated 1,3-bis(o-xenyl)-triazene from the resulting reaction mixture.

7. The process of making 1,3-bis(p-xenyl)-triazene having the structural formula

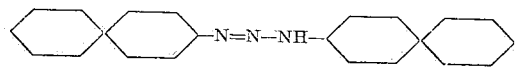

which comprises reacting p-xenylamine with methyl nitrite, said p-xenylamine being in solution in a normally liquid solvent selected from the group consisting of benzene, homologs of benzene, mono-ring-halogenated benzene and mono-ring-halogenated homologs of benzene, effecting precipitation of the 1,2-bis(p-xenyl)-triazene, and separating the precipitated 1,3-bis(p-xenyl)-triazene from the resulting reaction mixture.

8. The process of making symmetrical xenyltriazenes which comprises passing methyl nitrite into a solution of a xenylamine in a normally liquid solvent selected from the group consisting of benzene, homologs of benzene, mono-ring-halogenated benzene and mono-ring-halogenated homologs of benzene in a reaction zone.

9. The process of making symmetrical aryl triazenes from primary aromatic amines capable of forming symmetrical aryl triazenes and selected from the group consisting of those primary aromatic amines whose mineral acid salts are insoluble in water and those primary aromatic amines whose mineral acid salts are readily hydrolyzed by water and consequently difficultly diazotizable which comprises dissolving the primary aromatic amine in a normally liquid solvent selected from the group consisting of benzene, homologs of benzene, mono-ring-halogenated benzene and mono-ring-halogenated homologs of benzene and adding an alkyl nitrite.

10. The process of making symmetrical aryl triazenes from primary aromatic amines capable of forming symmetrical aryl triazenes and selected from the group consisting of those primary aromatic amines whose mineral acid salts are insoluble in water and those primary aromatic amines whose mineral acid salts are readily hydrolyzed by water and consequently difficultly diazotizable which comprises dissolving the primary aromatic amine in a normally liquid solvent selected from the group consisting of benzene, homologs of benzene, mono-ring-halogenated benzene and mono-ring-halogenated homologs of benzene, and passing methyl nitrite into the solution of said amine in a reaction zone.

11. The process of making symmetrical xenyltriazenes which comprises reacting a xenylamine in solution in a normally liquid solvent selected from the group consisting of benzene, homologs of benzene, mono-ring-halogenated benzene and mono-ring-halogenated homologs of benzene with an alkyl nitrite.

HENRY H. RICHMOND.

REFERENCES CITED

The following references are of record in the file of this patent:

FOREIGN PATENTS

| Number | Country | Date |
|--------|---------|------|
| 727,293 | France | Mar. 21, 1932 |
| 575,832 | Germany | May 3, 1933 |

OTHER REFERENCES

Berichte der Deut. Chem., vol. 8, page 1074 (1875).

Berichte der Deut. Chem., vol. 30, pages 1148–49, (1897).

Berichte der Deut. Chem., vol. 58B, page 1914, (1925).

Beilstein, 4th edition, vol. 16, page 727, (1933).

Saunders: The Aromatic Diazo Compounds; pages 15, 128–30, published by Edward Arnold & Co. (London), 1936.

Blatt: Organic Syntheses; Collective volume II, pages 163–5, 1943, published by John Wiley & Sons, London.